June 23, 1953       B. A. LIPPMANN ET AL.       2,643,295
MICROWAVE WHEATSTONE BRIDGE
Filed Sept. 13, 1946

INVENTORS
BERNARD A. LIPPMANN
JULIAN S. SCHWINGER
BY *M. A. Hayes*
ATTORNEY

Patented June 23, 1953

2,643,295

UNITED STATES PATENT OFFICE 2,643,295

MICROWAVE WHEATSTONE BRIDGE

Bernard A. Lippmann, New York, N. Y., and Julian S. Schwinger, Boston, Mass., assignors, by mesne assignments, to the United States of America as represented by the Secretary of the Navy Application September 13, 1946, Serial No. 696,922

6 Claims. (Cl. 178—44)

This invention relates in general to microwave bridge circuits and more particularly to a guided wave transmission line junction exhibiting the properties of a Wheatstone bridge.

The Wheatstone bridge is a conventional means for accurately determining resistance. It is very useful in making such measurements at low frequencies and with direct currents.

Circuit constants at radio frequency are generally determined by some form of substitution in a bridge circuit. A typical procedure includes first balancing the system as well as the standard impedances in the unknown arm of a bridge, then removing the unknown impedance and readjusting a standard impedance to restore balance. The change in the resistance and reactance components of the standard then indicates the corresponding components of the unknown. This method provides very accurate means of determining the unknown impedance except when the unknown impedance has a high Q. Under such conditions it is necessary to determine the exact equivalent of the standard impedance. Such procedures have been impractical with circuits employing waveguides.

It is thus an object of this invention to provide a means of joining a plurality of waveguides to form effectively a Wheatstone bridge circuit.

Another object of this invention is to provide a waveguide bridge for determining directly the impedance of an unknown element.

To accomplish the foregoing general objects, and more specific objects which hereinafter appear, my invention resides in the elements and their relation one to another as are more particularly described in the following specification. The specification is accompanied by drawings in which.

Figure 1:
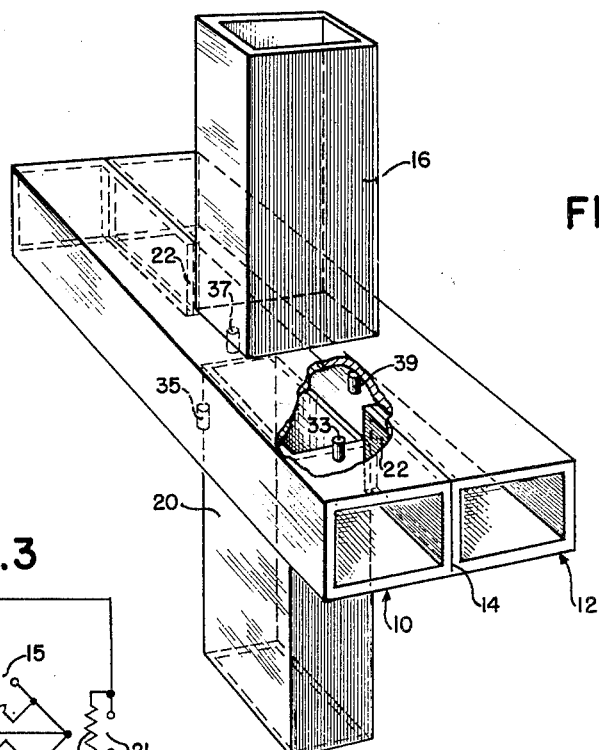
Fig. 1 is an illustration of one form of the invention.

Referring now to Fig. 1, the constructional details of a form of the invention will be described. Two rectangular waveguides 10 and 12 are joined together with a narrow wall of each in contact to form a common wall 14. (The guides 10 and 12 may be joined with a broad wall of each in contact, in which case the same principles will hold true as in the example illustrated and to be described.) A third rectangular waveguide 16 is mounted with its broad walls perpendicular to the common wall 14 of waveguides 10 and 12 and opening into waveguides 10 and 12 with the opening into the latter waveguides lying equal distances on either side of common wall 14. A fourth rectangular waveguide 20 is mounted in axial alignment with waveguide 16 but with its broad walls at right angles to the broad walls of waveguide 16, and opening into guides 10 and 12, as described for waveguide 16. This arrangement provides a waveguide connection with all four waveguides symmetrically positioned about the common junction. The common wall 14 between waveguides 10 and 12 is cut away to edges 22 and 22' to allow an open chamber in the junction region between waveguides 16 and 20. The apparatus of Fig. 1 is also illustrated in Fig. 2, which shows the same junction as viewed from above.

Figure 2:
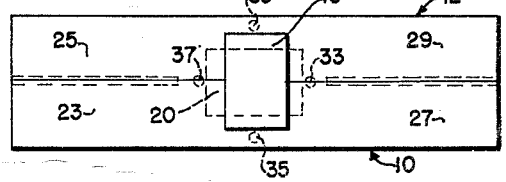
Fig. 2 is a top view of apparatus shown in Fig. 1.
Figure 3:
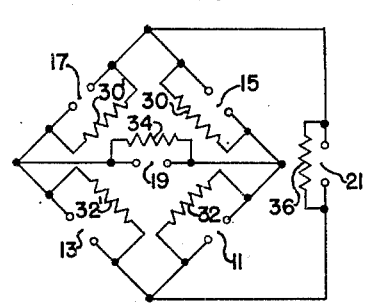
Fig. 3 is an equivalent circuit of the apparatus shown in Figs. 1 and 2.

Referring now to the Wheatstone bridge, Fig. 3, the terminals 11, 15, 19, 21, 13 and 17 represent the sections of the waveguides 10 and 12 designated by reference numerals 27, 29, 16, 20, 23, and 25 respectively, in Fig. 2. It can be shown by applying the methods conventionally employed in the analysis of waveguide junctions that the circuit of Fig. 3 is the equivalent of the apparatus shown in Figs. 1 and 2. If power is applied at terminals 21, and arms 11, 13, 15 and 17 are balanced, then there will be no output power at terminals 19. In a similar manner, the amount of power transferred into waveguide 16 from waveguide 20 will depend on the degree of unbalance, and by adjusting one arm of the bridge a balance may be obtained whereby an unknown impedance in one other arm is determinable. In Fig. 3, impedances 30, 30', 32, 32', 34 and 36 shunting the terminals 11, 13, 15, 17, 19 and 21 represent coupling impedances encountered at the junction point of the waveguide sections 27, 23, 29, 25, 16 and 20 respectively in Figs. 1 and 2. Impedances 30, 30', 32, 32' are all equal and although the balance relations of a conventional Wheatstone bridge hold for the circuit of Fig. 3, the range of operation is limited because of their presence in shunt with normal arm impedance. Impedances 34 and 36 do not affect the balance condition but limit the sensitivity of the bridge.

Figure 4:
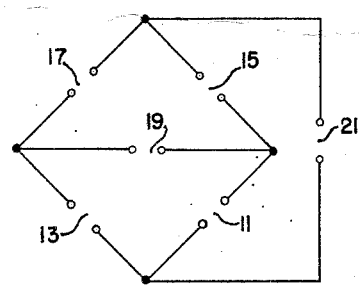
Fig. 4 is a simplified diagram of Fig. 3.

Coupling impedances 30, 30', 32, 32' can be eliminated by properly placed conductive pins 33, 35, 37 and 39 or other suitable discontinuities through the vertical and horizontal planes of symmetry as shown in Figs. 1 and 2 and thus lie in the plane of the normal electric field in waveguides 10 and 12. The position and shape of these pins is readily determined experimentally by adjustment until the coupling impedances 30, 30', 32, 32' are eliminated when bridge is balanced. The pins 33, 35, 37 and 39 need not necessarily be located as shown but may be symmetrically placed anywhere about the geometric center of the common junction. Other pins or irises, not shown, may be used to balance out impedances 34 and 36. After pins have been placed in the above manner the waveguide junction will effectively act as the Wheatstone bridge shown in Fig. 4, wherein the terminals 11, 13, 15, 17, 19, and 21 correspond to the waveguide sections as above described in connection with Fig. 3.

The waveguide junction may now be used as a Wheatstone bridge in a conventional manner by applying power to waveguide 20 and inserting detection means (not shown) in waveguide 16. Appropriate impedances may be placed in waveguide sections 29 and 25 for example. The unknown impedance may be placed in guide section 23 for example and an adjustable impedance in guide section 27 to balance the bridge. When the bridge is so balanced the unknown impedance may be determined in the usual manner from relations which are well known and not herein described.

Figure 5:
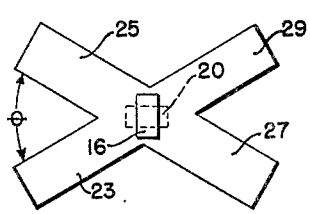
Fig. 5 illustrates another form of the invention.

Fig. 5 shows another form of the invention. As illustrated waveguide sections 27, 23, 29 and 25 are set at an angle with respect to each other, and thereby eliminate the junction impedances 30, 30', 32, 32' (Fig. 3). This may be accomplished only at one angle θ, but the waveguides sections may be set at any angle if pins are employed as mentioned above to eliminate junction impedances.

It is necessary for junctions as shown in Figs. 1, 2, and 5 that the two waveguides 16 and 20 be at right angles to each other at opposite sides of the waveguide sections 23, 25, 27, and 29. As long as a symmetrical arrangement is maintained the junction shown will act as a bridge circuit. Waveguides 16 and 20 are interchangeable as power or detector circuits.

It is believed that the construction and operation as well as the advantages of the improved microwave bridge will be apparent from the foregoing detailed description thereof. It will also be apparent that while the invention has been shown and described in a preferred form changes may be made in the apparatus disclosed without departing from the spirit of the invention as sought to be defined in the following claims.

What is claimed is:

1. A microwave wave guide junction comprising first and second contiguous rectangular wave guides having an opening in the contiguous wall to form a common junction chamber having four wave guide arms, third and fourth axially aligned rectangular wave guides fastened to opposite walls respectively of said first and second wave guides and opening equally into each of said first and second wave guides at said common junction, said third and fourth wave guides each having a broad wall and being so fastened that the broad wall of said third wave guide is perpendicular to the broad wall of said fourth wave guide.

2. A microwave wave guide junction comprising, first and second contiguous rectangular wave guides having an opening in the contiguous wall to form a common junction chamber having four wave guide arms, third and fourth axially aligned rectangular wave guides joined at opposite walls respectively of said first and second wave guides and opening equally into each of said first and second wave guides at said common junction, means for exciting said wave guides with electromagnetic energy having an electric field component, said third and fourth wave guides being so arranged that the electric field in said third wave guide will normally be at right angles to the electric field in said fourth wave guide.

3. A microwave wave guide junction comprising, first and second contiguous rectangular wave guides having an opening in the common contiguous wall to form a common junction chamber having four wave guide arms, a third rectangular wave guide mounted with its broad walls perpendicular to said common wall and opening equally into said first and second wave guides at the location of said chamber and a fourth rectangular wave guide mounted in axial alignment with said third wave guide on opposite walls of said first and second wave guides with its narrow walls perpendicular to said common wall and opening equally into each of said first and second wave guides at the location of said chamber.

4. A microwave wave guide junction comprising, first and second contiguous rectangular wave guides having an opening in the common contiguous wall to form a common junction chamber having four wave guide arms, a third rectangular wave guide mounted with its broad walls perpendicular to said common wall and opening equally into said first and second wave guides at the location of said chamber, a fourth rectangular wave guide mounted in axial alignment with said third wave guide on opposite walls of said first and second wave guides with its narrow walls perpendicular to said common wall and opening equally into each of said first and second wave guides at the location of said chamber, and means in said first and second wave guides operative to eliminate coupling impedances at said common junction.

5. A microwave wave guide junction comprising, first and second contiguous rectangular wave guides having an opening in the common contiguous wall to form a common junction chamber having four wave guide arms, a third rectangular wave guide mounted with its broad walls perpendicular to said common wall and opening equally into said first and second wave guides at the location of said chamber and a fourth rectangular wave guide mounted in axial alignment with said third wave guide on opposite walls of said first and second wave guides with its narrow walls perpendicular to said common wall and opening equally into each of said first and second wave guides at the location of said chamber, means for exciting said wave guides with electromagnetic energy having an electric field component and means employing a plurality of conductive pins mounted in the plane of the normal electric field in said first and second wave guides for eliminating coupling impedances at said common junction, said pins being symmetrically placed about the center of said common junction.

6. A microwave wave guide junction comprising, first and second contiguous rectangular wave guides having an opening in the common contiguous wall to form a common junction chamber having four wave guide arms, a third rectangular wave guide mounted with its broad walls perpendicular to said common wall and opening equally into said first and second wave guides at the location of said chamber, a fourth rectangular wave guide mounted in axial alignment with said third wave guide on opposite walls of said first and second wave guides with its narrow walls perpendicular to said common wall and opening equally into each of said first and second wave guides at the location of said chamber, means for exciting said wave guides with electromagnetic energy having an electric field component, said third and fourth wave guides being so arranged that the electric field in said third wave guide will normally be at right angles to the electric field in said fourth wave guide and means employing a plurality of conductive pins mounted in the plane of the normal electric field in said first and second wave guides for eliminating coupling impedances at said common junction, said pins being symmetrically placed about the center of said common junction.

BERNARD A. LIPPMANN.
JULIAN S. SCHWINGER.

References Cited in the file of this patent

UNITED STATES PATENTS

| Number | Name | Date |
|---|---|---|
| 2,434,645 | Fox | Jan. 20, 1948 |
| 2,441,598 | Robertson | May 18, 1948 |

FOREIGN PATENTS

| Number | Country | Date |
|---|---|---|
| 116,110 | Australia | Nov. 4, 1942 |